(12) United States Patent
Lee

(10) Patent No.: US 12,458,716 B2
(45) Date of Patent: Nov. 4, 2025

(54) ULTRAVIOLET STERILIZATION APPARATUS AND METHOD OF CONTROLLING THE SAME

(71) Applicants: HYUNDAI MOTOR COMPANY, Seoul (KR); KIA CORPORATION, Seoul (KR)

(72) Inventor: Jae Seung Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 809 days.

(21) Appl. No.: 17/547,928

(22) Filed: Dec. 10, 2021

(65) Prior Publication Data
US 2022/0395594 A1  Dec. 15, 2022

(30) Foreign Application Priority Data

Jun. 9, 2021 (KR) .......................... 10-2021-0074561

(51) Int. Cl.
*A61L 2/10* (2006.01)
*A61L 2/24* (2006.01)
*A61L 2/26* (2006.01)

(52) U.S. Cl.
CPC .................. *A61L 2/10* (2013.01); *A61L 2/24* (2013.01); *A61L 2/26* (2013.01); *A61L 2202/11* (2013.01); *A61L 2202/14* (2013.01); *A61L 2202/16* (2013.01); *A61L 2202/25* (2013.01)

(58) Field of Classification Search
CPC ..... A61L 2/10; A61L 2/24; A61L 2/26; A61L 9/20; A61L 2202/11; A61L 2202/14; A61L 2202/16; A61L 2202/25
See application file for complete search history.

(56) References Cited

U.S. PATENT DOCUMENTS

| | | | |
|---|---|---|---|
| 4,196,889 A * | 4/1980 | Dudek | B66D 1/22 475/318 |
| 10,893,990 B1 | 1/2021 | Uda | |
| 2018/0250430 A1 * | 9/2018 | Machovina | B01D 53/30 |
| 2020/0197550 A1 | 6/2020 | Barron et al. | |
| 2022/0072184 A1 * | 3/2022 | Groves | A61L 2/08 |
| 2022/0193280 A1 * | 6/2022 | James | A61L 2/10 |
| 2022/0395595 A1 * | 12/2022 | Lee | A61L 2/10 |

FOREIGN PATENT DOCUMENTS

| | | |
|---|---|---|
| CN | 206198339 U | 5/2017 |
| DE | 102019213094 A1 | 3/2021 |

* cited by examiner

*Primary Examiner* — Timothy C Cleveland
(74) *Attorney, Agent, or Firm* — Lempia Summerfield Katz LLC

(57) ABSTRACT

The present disclosure provides an ultraviolet (UV) sterilization apparatus that has improved heat dissipation performance and is capable of being changed in position. The UV sterilization apparatus includes a sterilization unit configured to be movable to a predetermined position and including a UV emitter, a driving unit configured to move the sterilization unit, and a cover having a structure accommodating the sterilization unit and allowing the inside of the cover to communicate with the outside. A heat sink is provided in the cover in order to dissipate heat from the sterilization unit.

12 Claims, 20 Drawing Sheets

ULTRAVIOLET STERILIZATION APPARATUS AND METHOD OF CONTROLLING THE SAME

CROSS-REFERENCE TO RELATED APPLICATION

This application claims under 35 U.S.C. § 119(a) the benefit of priority from Korean Patent Application No. 10-2021-0074561, filed on Jun. 9, 2021, the entire contents of which are incorporated herein by reference.

BACKGROUND

(a) Technical Field

The present disclosure relates to an ultraviolet (UV) sterilization apparatus and more particularly, to a UV sterilization apparatus that has improved heat dissipation performance and is capable of being changed in position.

(b) Background Art

Ultraviolet (UV) light is used for a sterilization apparatus because it can promote chemical reactions, oxidize organic matter, and eradicate microorganisms. Recently, in particular, interest in hygiene and sterilization has increased more than ever before due to the coronavirus pandemic.

UV light includes UV-C light having a wavelength in the range of 200 to 280 nanometers (nm), UV-B light having a wavelength in the range of 280 to 315 nm, and UV-A light having a wavelength in the range of 315 to 400 nm. It is known that, when UV-C light, which has a sterilization function, is radiated onto deoxyribonucleic acid (DNA), it destroys the DNA and suppresses the regeneration and replication thereof, thus eradicating viruses. Because it has recently been reported that UV-C light is effective against coronavirus, UV-C light-emitting diode (LED) products for eradicating the coronavirus have been developed.

Due to this trend, attempts are being made to apply a UV sterilization apparatus to a vehicle in order to sterilize the passenger compartment of a vehicle, which is an enclosed space.

The above information disclosed in this Background section is only for enhancement of understanding of the background of the disclosure, and therefore it may contain information that does not form the related art that is already known in this country to a person of ordinary skill in the art.

SUMMARY OF THE DISCLOSURE

The present disclosure has been made in an effort to solve the above-described problems associated with the related art, and it is an object of the present disclosure to provide a UV sterilization apparatus having improved sterilization performance and reliability.

It is another object of the present disclosure to provide a UV sterilization apparatus having excellent heat dissipation performance.

However, the objects to be accomplished by the present disclosure are not limited to the above-mentioned objects, and other objects not mentioned herein should be clearly understood by those having ordinary skill in the art from the following description.

In one aspect, the present disclosure provides an ultraviolet (UV) sterilization apparatus including a sterilization unit configured to be movable to a predetermined position. The UV sterilization apparatus includes a UV emitter, a driving unit configured to move the sterilization unit, and a cover having a structure accommodating the sterilization unit and allowing the inside of the cover to communicate with the outside. A heat sink is provided in the cover in order to dissipate heat from the sterilization unit.

In another aspect, the present disclosure provides a method of controlling a UV sterilization apparatus. The method includes sensing the temperature in an enclosed space in which a sterilization unit is located, driving a motor, configured to move the sterilization unit into or out of an enclosure located in the enclosed space, to move the sterilization unit out of the enclosure located in the enclosed space when the temperature exceeds a predetermined threshold temperature, and driving the motor to move the sterilization unit back into the enclosure located in the enclosed space when the temperature becomes equal to or lower than the threshold temperature.

Other aspects and embodiments of the disclosure are discussed below.

The above and other features of the disclosure are discussed below.

BRIEF DESCRIPTION OF THE DRAWINGS

The above and other features of the present disclosure are described in detail below with reference to certain embodiments thereof, illustrated in the accompanying drawings, which are given hereinbelow by way of illustration only, and thus are not limitative of the present disclosure, and wherein.

Figure 1:
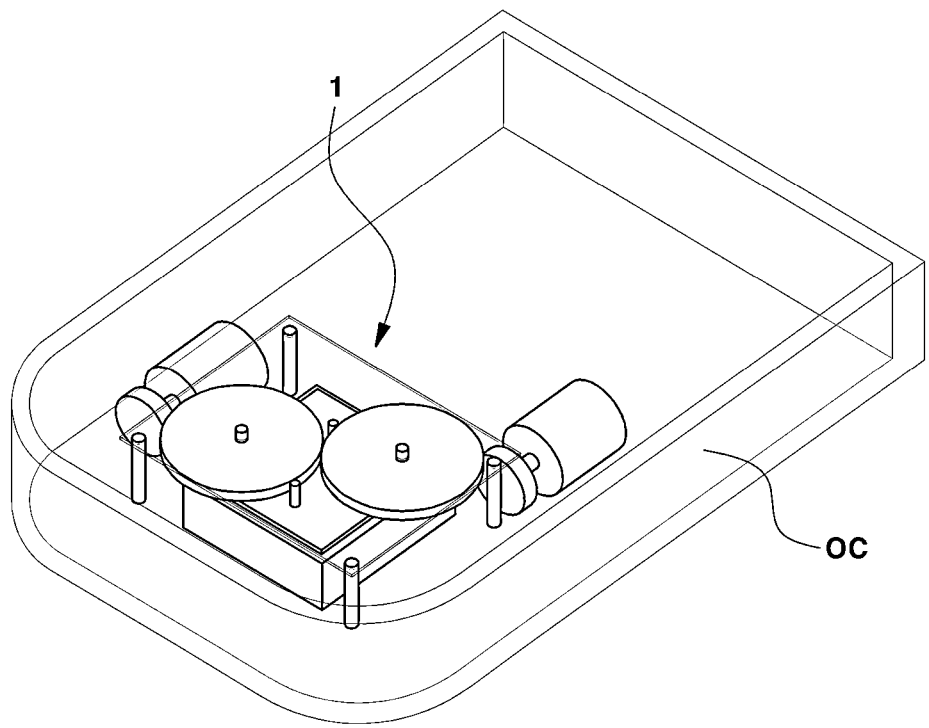
FIGS. 1 and 2 illustrate an installation example of a UV sterilization apparatus according to the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, embodiments of the present disclosure are described in detail with reference to the accompanying drawings. Specific structures or functions described in the embodiments of the present disclosure are merely for illustrative purposes. Embodiments according to the concept of the present disclosure may be implemented in various forms, and it should be understood that they should not be construed as being limited to the embodiments described in the present specification, but include all of modifications, equivalents, or substitutes included in the spirit and scope of the present disclosure.

It should be understood that, although the terms "first," "second," and the like may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It should be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for the purpose of describing particular embodiments only and is not intended to be limiting. As used herein, the singular forms "a," "an," and "the" are intended to include the plural forms as well, unless the context clearly indicates otherwise. It should be further understood that the terms "comprise," "include," "have," and the like, when used in this specification, specify the presence of stated components, steps, operations, and/or elements, but do not preclude the presence or addition of one or more other components, steps, operations, and/or elements thereof.

An object of the present disclosure is to provide a UV sterilization apparatus for sterilizing an enclosed indoor space, particularly the passenger compartment of a vehicle.

With regard to a UV-C LED, as the distance from an emission source to a target to be sterilized increases, or depending on an emission angle, the intensity of light decreases, and the sterilization performance is degraded. Therefore, the longer the distance between the UV-C LED and the target to be sterilized, the longer the emission time.

Further, a UV-C LED is less effective and is more prone to failure in a high-temperature environment. When a UV-C LED operates in a high-temperature environment, for example, such as when a vehicle is parked under direct sunlight, the effect of the LED may be degraded, or may break down due to high temperatures.

In general, in the passenger compartment of a vehicle, large amounts of bacteria are present on a steering wheel provided in front of a driver's seat, door handles, seat belts, cup holders, a gear selector, and a center fascia. Therefore, the sterilization apparatus needs to be installed in a vehicle so that the sterilization effect is applied to various points in the passenger compartment of the vehicle.

An object of the present disclosure is to provide a UV sterilization apparatus and a method of controlling the same capable of preventing degradation of sterilization performance due to an increase in the distance to a target to be sterilized and of preventing deterioration in the performance of the sterilization apparatus in a high-temperature environment.

In addition, an object of the present disclosure is to provide a UV sterilization apparatus and a method of controlling the same capable of effectively dissipating heat generated during the operation of the UV sterilization apparatus or the heat of a high-temperature environment.

Hereinafter, the present disclosure is described in detail with reference to the accompanying drawings.

As shown in FIG. 1, a UV sterilization apparatus 1 according to the present disclosure may be used in any indoor space requiring sterilization. In particular, the UV sterilization apparatus according to the present disclosure may achieve sterilization more effectively when used in a confined indoor space, for example, the passenger compartment of a vehicle.

Figure 2:
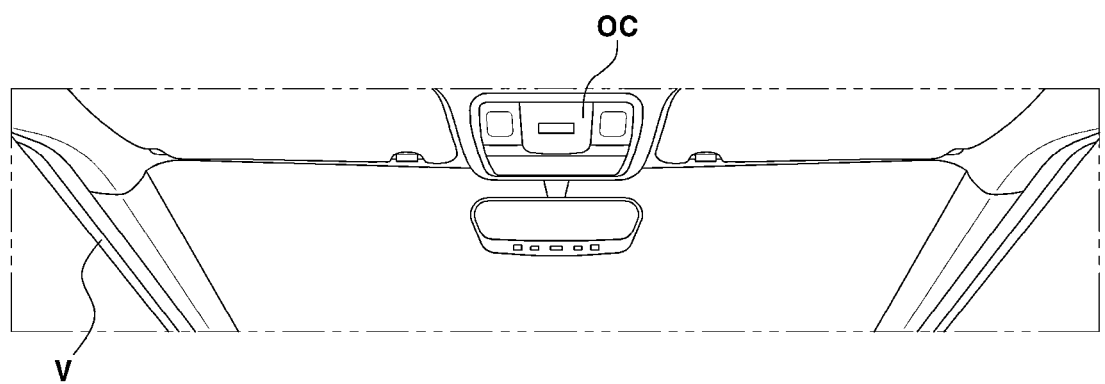

The UV sterilization apparatus 1 according to the present disclosure may be mounted at any position in a vehicle V. In particular, as shown in FIG. 2, the UV sterilization apparatus 1 may be mounted to an upper side in the passenger compartment of the vehicle V, for example, the roof, the head lining, or the overhead console OC of the vehicle V. Hereinafter, the case in which the UV sterilization apparatus 1 is mounted in the overhead console OC is described by way of example. However, the UV sterilization apparatus 1 is not necessarily mounted in the overhead console OC, and may be mounted at any position, so long as the apparatus 1 is capable of vertically moving.

Figure 3A:
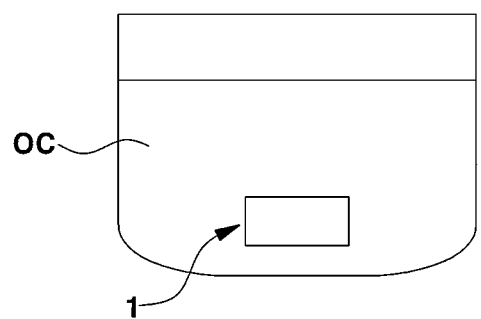
FIG. 3A illustrates the state in which the UV sterilization apparatus according to the present disclosure is installed in an overhead console of a vehicle.
Figure 3B:
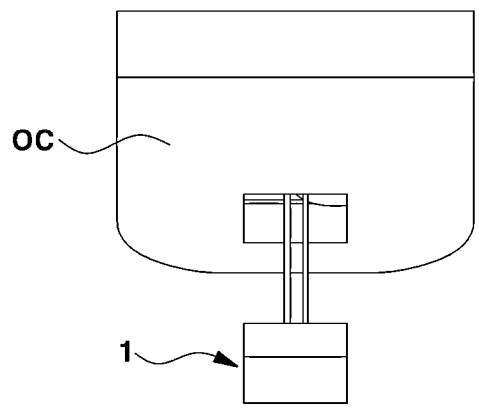
FIG. 3B illustrates the state in which the position of the UV sterilization apparatus shown in FIG. 3A is changed.

As shown in FIGS. 3A and 3B, the UV sterilization apparatus 1 according to the present disclosure is configured to be movable. The UV sterilization apparatus 1 is configured to be capable of ascending and descending in the state of being mounted in the overhead console OC. In particular, the UV sterilization apparatus 1 is formed to be movable upwards and downwards in order to satisfy temperature conditions and/or improve sterilization performance. This is described below.

Figure 4:
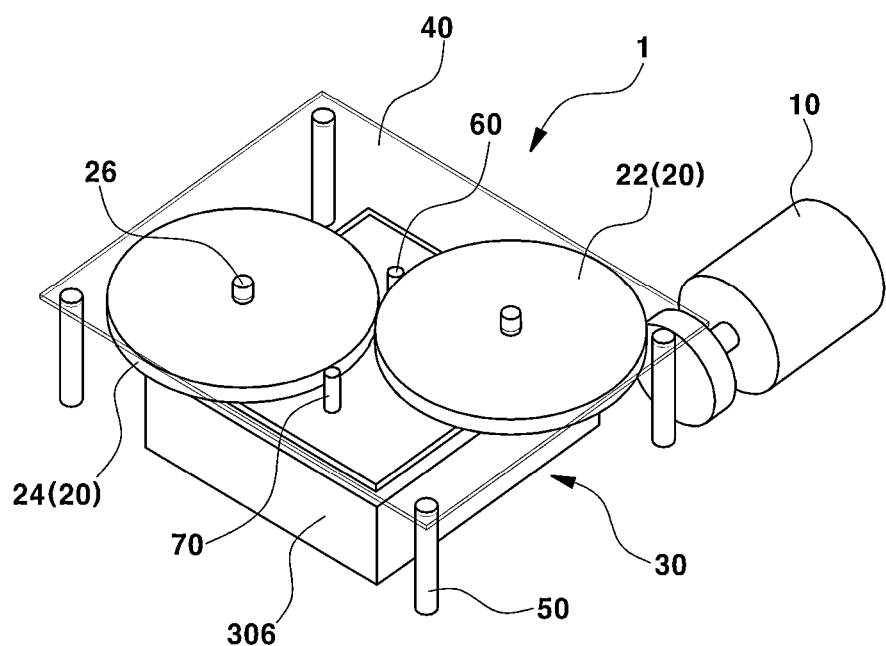
FIG. 4 is a perspective view of the UV sterilization apparatus according to the present disclosure.
Figure 5:
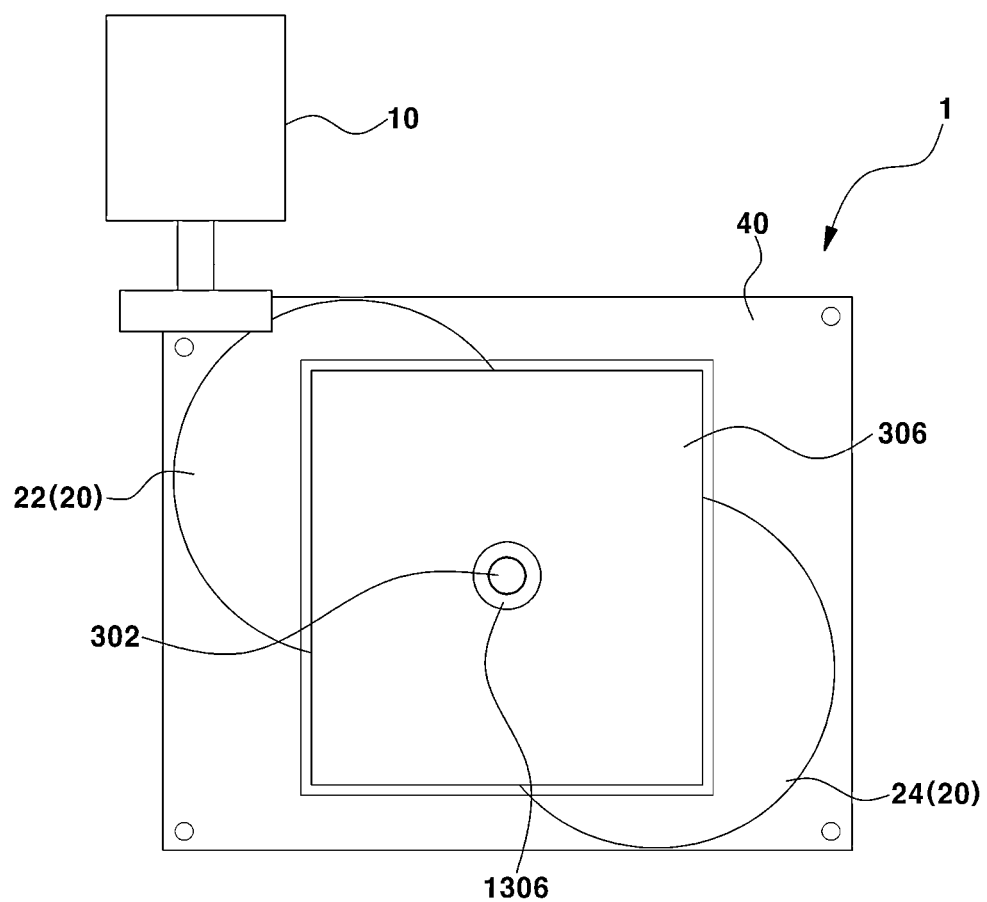
FIG. 5 is a bottom view of FIG. 4.

As shown in FIGS. 4 and 5, according to an embodiment of the present disclosure, the UV sterilization apparatus 1 includes a motor 10, a pulley 20, and a sterilization unit 30 to ascend and descend. The motor 10 and the pulley 20 are fixed, and the sterilization unit 30 is configured to be moved upwards and downwards by the operation of the motor 10 and the pulley 20.

The motor 10 and the pulley 20 are fixed in the overhead console OC, and the motor 10 provides driving force to the pulley 20. According to an embodiment of the present disclosure, the pulley 20 includes a first pulley 22 and a second pulley 24.

The pulley 20 may be fixed in the overhead console OC through a fixing panel 40. The fixing panel 40 is coupled to the overhead console OC through a support pin 50. Each of the first pulley 22 and the second pulley 24 is rotatably mounted to the fixing panel 40 through a pulley pin 26. In addition, the pulley 20 is configured such that, when the first pulley 22 is rotated, the second pulley 24 is also rotated together therewith. More specifically, when the motor 10 provides rotational force to the first pulley 22, the second pulley 24, which is engaged with the first pulley 22, is also rotated together therewith.

A first wire 60 is wound around the first pulley 22. When the motor 10 rotates in a first direction to rotate the first pulley 22, the first wire 60 wound around the first pulley 22 may be unwound therefrom. Similarly, a second wire 70 is wound around the second pulley 24. As the second pulley 24 is rotated in association with the first pulley 22, the second wire 70 wound around the second pulley 24 is unwound therefrom. The first wire 60 may be one of an anode wire and a cathode wire, and the second wire 70 may be the other one of the anode wire and the cathode wire.

In addition, when the motor 10 rotates in a second direction, which is opposite the first direction, to rotate the first pulley 22, the unwound first wire 60 may be wound around the first pulley 22 again. Similarly, as the second pulley 24 is rotated in association with the first pulley 22, the unwound second wire 70 may be wound around the second pulley 24 again.

The first wire 60 and the second wire 70 are connected to the sterilization unit 30 to supply power to the sterilization unit 30. The first wire 60 and the second wire 70 are respectively unwound from or wound around the first pulley 22 and the second pulley 24 by the operation of the motor 10 and the first and second pulleys 22 and 24, thereby making it possible to change the position of the sterilization unit 30 with respect to the overhead console OC.

The sterilization unit 30 includes a UV emitter 302, configured to generate a UV ray to perform sterilization. According to an embodiment of the present disclosure, the UV emitter 302 is a light-emitting diode (LED) configured to generate UV radiation, such as UV-C radiation.

Figure 6:
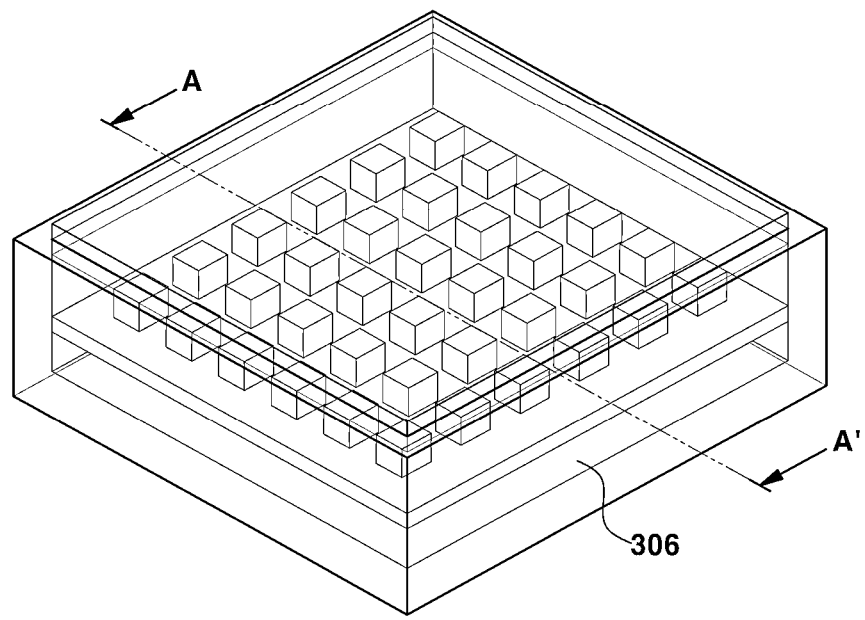
FIG. 6 illustrates a sterilization unit of the UV sterilization apparatus according to the present disclosure.
Figure 7:
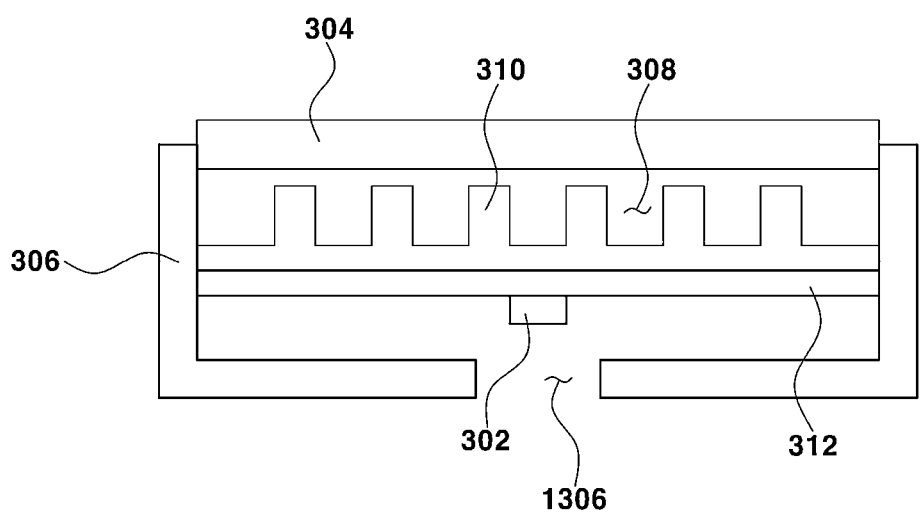
FIG. 7 is a cross-sectional view taken along line A-A' in FIG. 6.

Referring to FIGS. 6 and 7, the sterilization unit 30 includes an inner cover 304. The inner cover 304 is disposed to face the pulley 20. In particular, the first wire 60 and the second wire 70 may be coupled to the inner cover 304. Accordingly, the sterilization unit 30 may ascend or descend due to a change in the length of the first wire 60 and the second wire 70. The inner cover 304 may be made of an aluminum material, which has excellent heat dissipation performance, but an embodiment is not limited thereto.

Figure 8A:
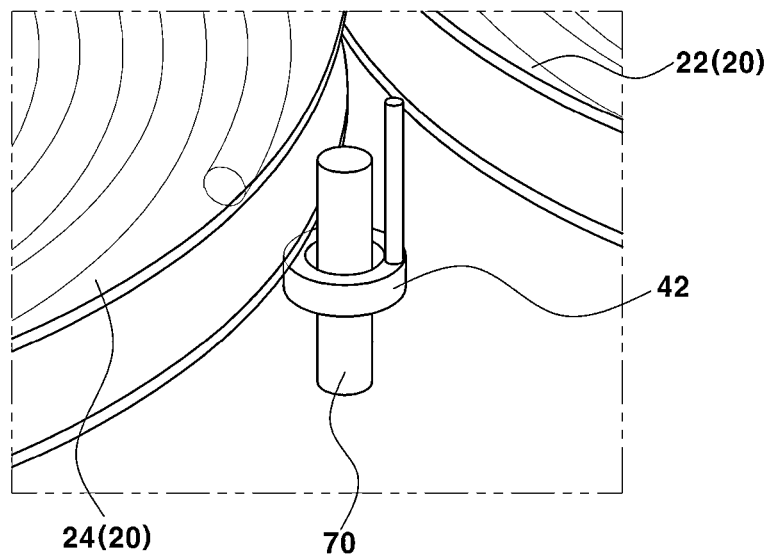
FIG. 8A is a partial enlarged view of FIG. 4.
Figure 8B:
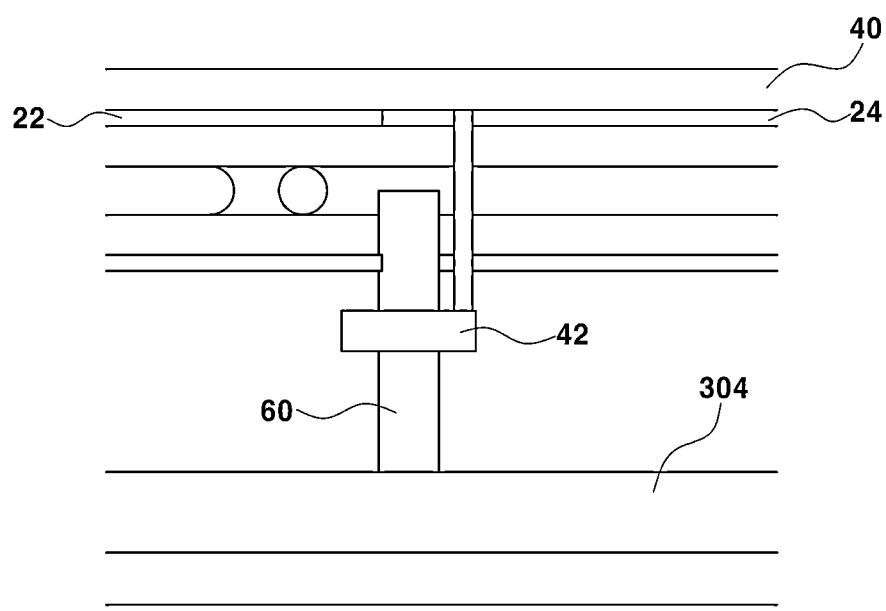
FIG. 8B is a partial enlarged rear view of FIG. 4.
Figure 9:
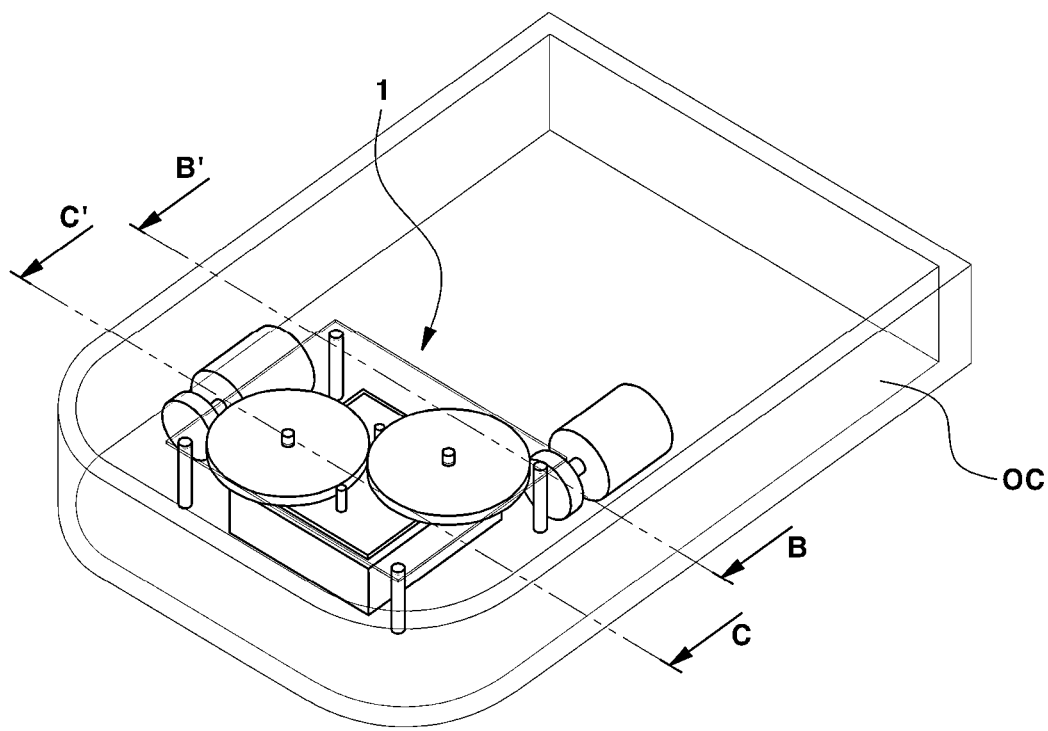
FIG. 9 illustrates an installation example of the UV sterilization apparatus according to the present disclosure.
Figure 10A:
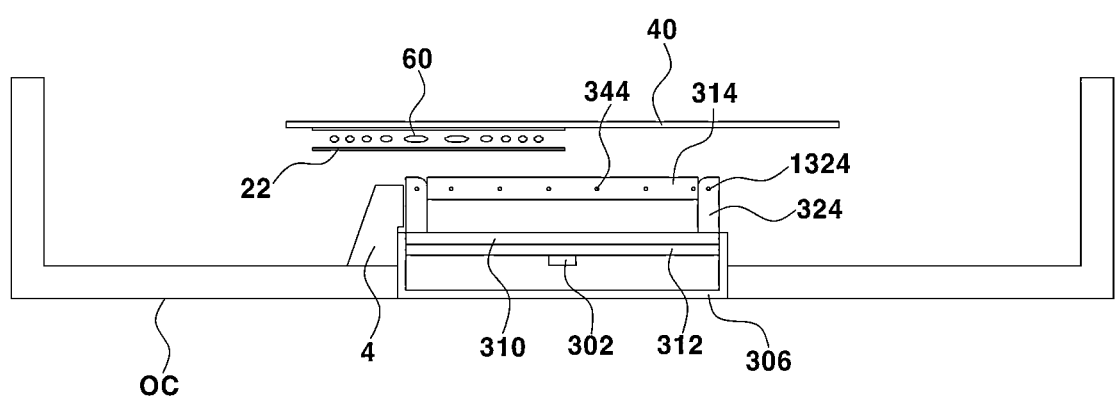
FIG. 10A is a cross-sectional view taken along line B-B' in FIG. 9 when the sterilization unit according to the present disclosure is located in an overhead console.
Figure 10B:
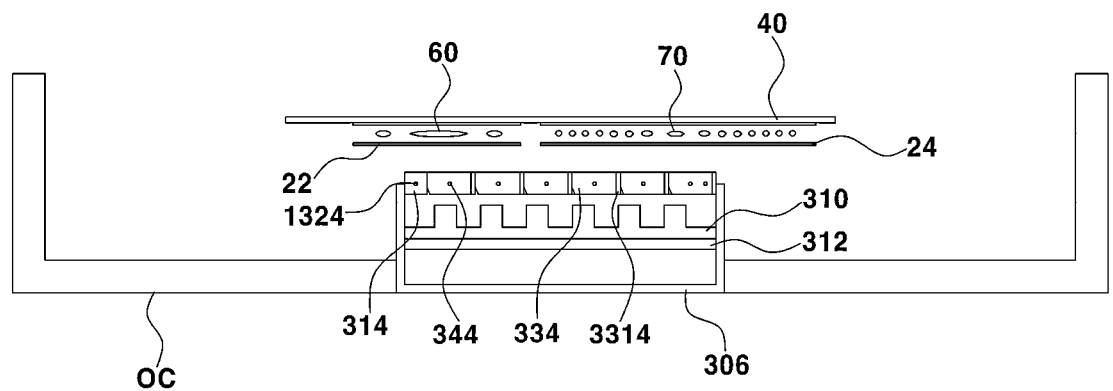
FIG. 10B is a cross-sectional view taken along line C-C' in FIG. 9 when the sterilization unit according to the present disclosure is located in the overhead console.
Figure 11:
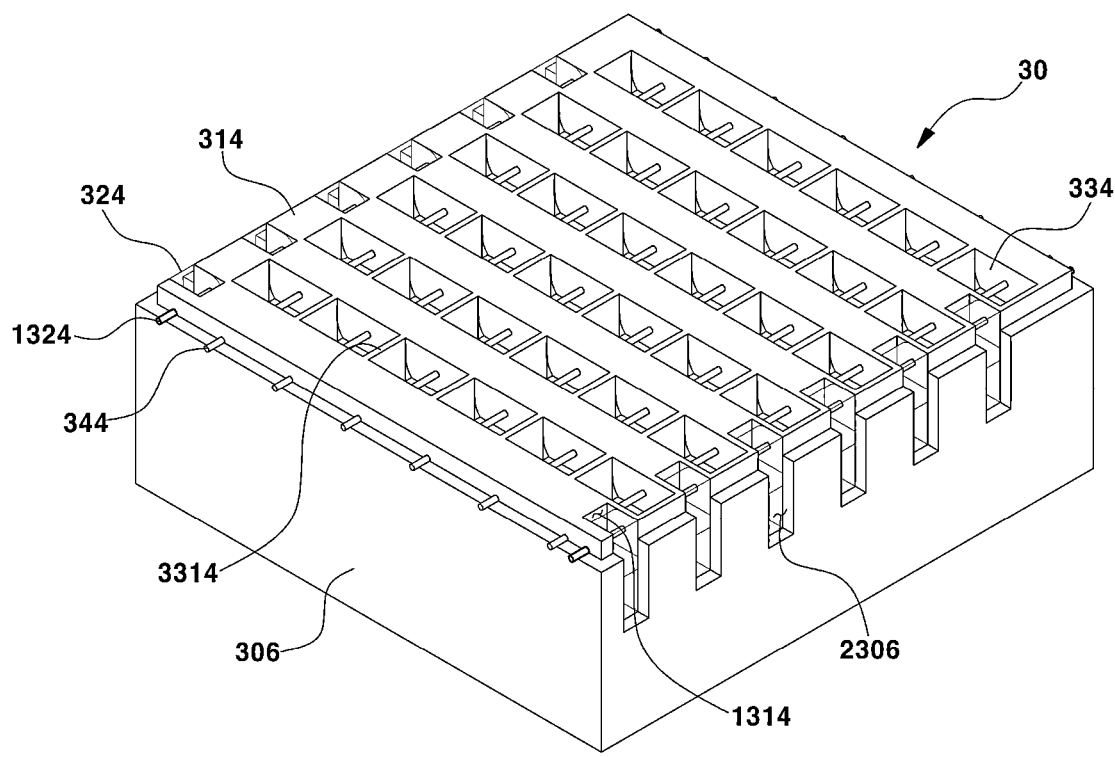
FIG. 11 is a perspective view when the sterilization unit according to the present disclosure is located in the overhead console.
Figure 12A:
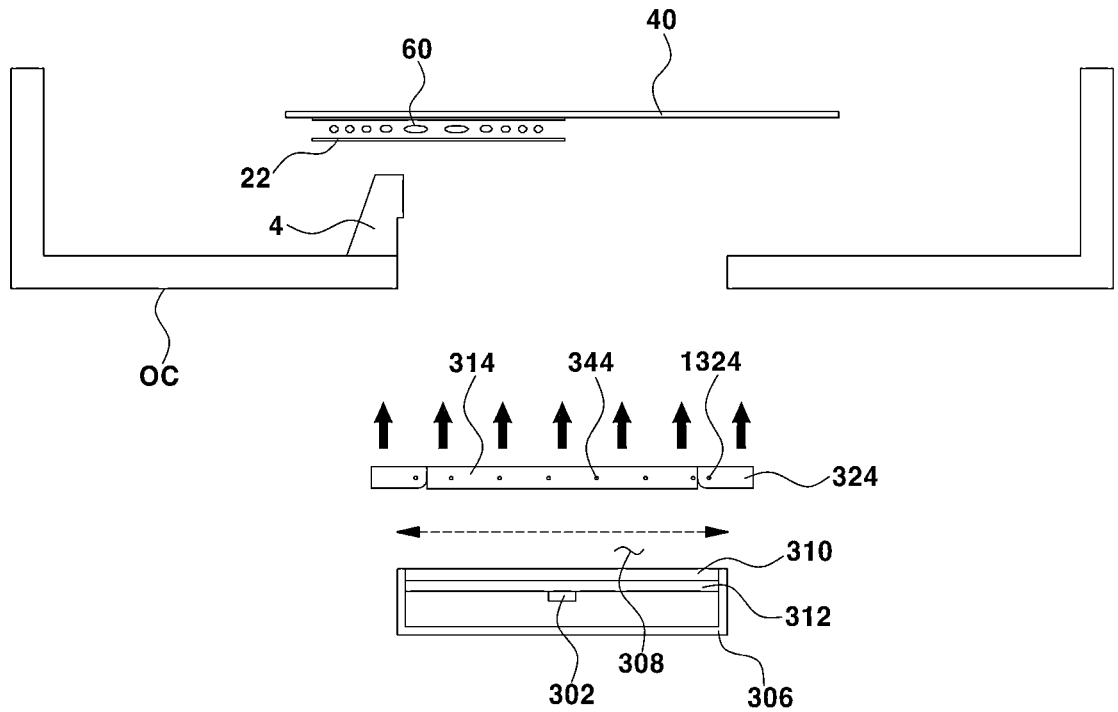
FIG. 12A is a cross-sectional view taken along line B-B' in FIG. 9 when the sterilization unit according to the present disclosure descends from the overhead console.
Figure 12B:
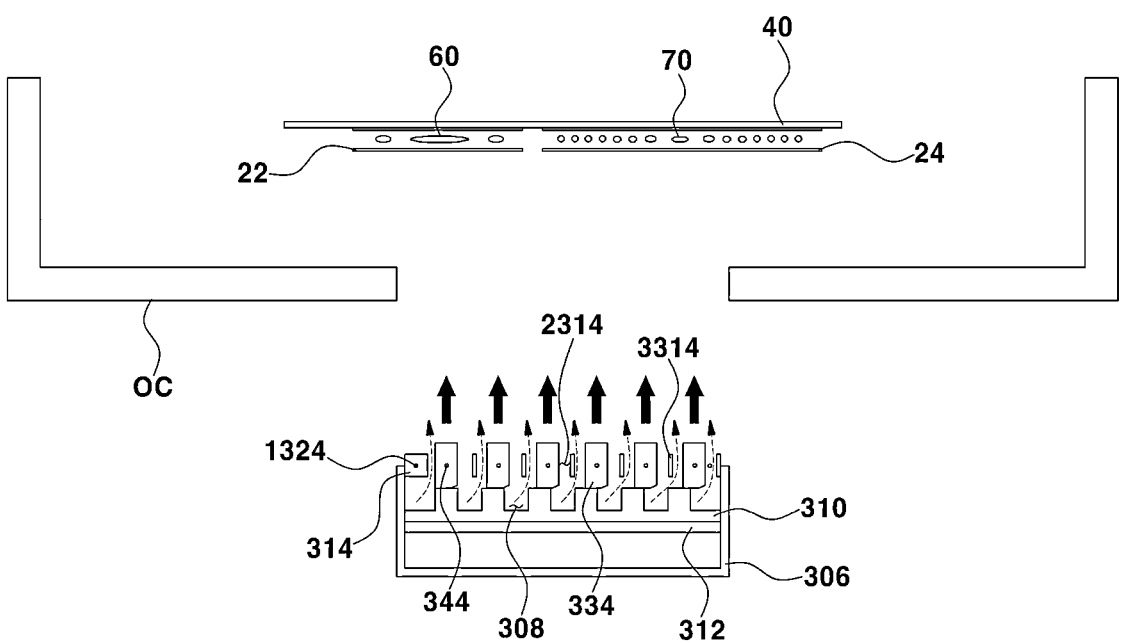
FIG. 12B is a cross-sectional view taken along line C-C' in FIG. 9 when the sterilization unit according to the present disclosure descends from the overhead console.
Figure 13:
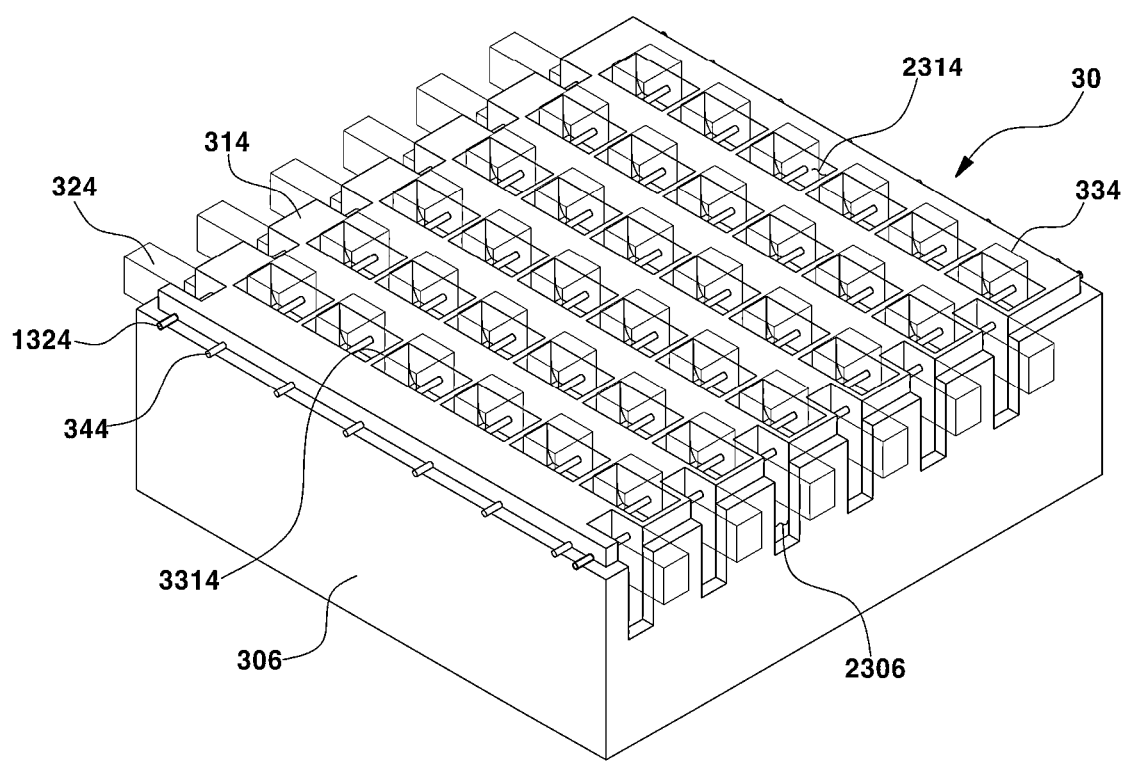
FIG. 13 is a perspective view when the sterilization unit according to the present disclosure descends from the overhead console.

Referring to FIGS. 8A and 8B, according to an embodiment of the present disclosure, at least two wire-fixing rings 42 may be mounted to the fixing panel 40. One of the wire-fixing rings 42 serves to guide the first wire 60 extending from the first pulley 22. Similarly, another one of the wire-fixing ring 42 guides the second wire 70 extending from the second pulley 24.

Referring again to FIG. 7, the inner cover 304 is coupled to an outer cover 306, and a space 308 is formed between the inner cover 304 and the outer cover 306. The outer cover 306 accommodates the components of the sterilization unit 30, and an opening 1306 is formed in the bottom or in the center of the lower surface of the outer cover 306. The light generated by the UV emitter 302, which is accommodated in the outer cover 306, is emitted to the outside of the sterilization unit 30 through the opening 1306.

A printed circuit board 312 including a heat sink 310 for heat dissipation is disposed in the space 308. The printed circuit board 312 is configured to receive instructions from a controller 80, such as a vehicle control unit, and to control the operation of the UV emitter 302 disposed under the printed circuit board 312.

According to an embodiment of the present disclosure, the inner cover 304 is configured to provide additional heat dissipation performance. To this end, according to the present disclosure, the inner cover 304 is formed to allow the space 308 to communicate with the outside. In particular, when the inner cover 304 descends from the overhead console OC, it allows the space 308 to communicate with the outside. In addition, the heat dissipation structure according to the present disclosure secures an air flow passage and increases a heat dissipation area, thereby maximizing the heat dissipation performance. To this end, according to an embodiment of the present disclosure, as shown in FIGS. 9 to 13, the inner cover 304 includes a frame 314, releasing elements 324, and rotating elements 334.

The frame 314 forms the framework of the inner cover 304 and is fixed to the outer cover 306. The frame 314 includes a plurality of fitting portions 1314. The fitting portions 1314 are formed in both sides of the frame 314 and are formed to be depressed from respective sides of the frame 314 toward the center line of the frame 314. The fitting portions 1314 formed in one side of the frame 314 and the fitting portions 1314 formed in the opposite side of the frame 314 face each other. The fitting portions 1314 formed in each of the two sides of the frame 314 are spaced apart from each other at regular intervals.

In addition, the frame 314 includes a plurality of chambers 2314. Each of the chambers 2314 forms an empty space having a predetermined volume in the frame 314. The chambers 2314 are formed in the intervals between the fitting portions 1314 and are arranged in a direction perpendicular to the direction in which the fitting portions 1314 are spaced apart from each other. Specifically, the chambers 2314 are formed in a direction perpendicular to the direction in which the fitting portions 1314 are arranged, and are separated from each other by a wall 3314, which is formed between neighboring ones of the chambers 2314 and extends in the direction in which the fitting portions 1314 are arranged.

The releasing elements 324 are coupled to the frame 314. Particularly, the releasing elements 324 are rotatably received in the fitting portions 1314. According to an embodiment of the present disclosure, the outer cover 306 includes a plurality of cut-out portions 2306 configured to overlap the fitting portions 1314 of the frame 314. The releasing elements 324 are coupled into the fitting portions 1314 and extend to the cut-out portions 2306.

The releasing elements 324 are received in the fitting portions 1314 and the cut-out portions 2306 by the external force applied to the frame 314. When the external force applied to the frame 314 is removed, the releasing elements 324 spread out in a manner such that the portions thereof that are received in the cut-out portions 2306 are rotated outwards about the portions thereof that are received in the fitting portions 1314. To this end, according to an embodiment of the present disclosure, torsion springs may be mounted to the fitting portions 1314 and the releasing elements 324. However, the embodiment is not limited thereto, and any component other than a torsion spring may be used, so long as it is capable of rotating the releasing elements 324 outwards. In addition, the external force applied to the frame 314 is provided by fixing elements 4, which are provided at the overhead console OC. In addition, the releasing elements 324 are arranged in the direction in which the fitting portions 1314 are arranged, and are coupled to shafts 1324 penetrating the fitting portions 1314 to rotate together therewith.

The rotating elements 334 are disposed in the respective chambers 2314. The rotating elements 334 are rotatably disposed in the respective chambers 2314. In the normal state thereof, the rotating elements 334 close the chambers 2314. In the rotated state thereof, the rotating elements 334 allow the space 308 and the chambers 2314 to communicate with the outside of the sterilization unit 30.

According to an embodiment of the present disclosure, the rotating elements 334 may be rotated by rotary shafts 344. The rotary shafts 344 penetrate the frame 314 in a direction parallel to the direction in which the fitting portions 1314 are arranged and penetrate the chambers 2314 arranged in the direction in which the fitting portions 1314 are arranged. Specifically, each of the rotary shafts 344 penetrates a respective one of rows of chambers 2314 that are arranged in series in the direction in which the fitting portions 1314 are arranged. Accordingly, the rotary shafts 344 are disposed to be spaced apart from each other at regular intervals between the fitting portions 1314, which are formed in both sides of the frame 314.

Figure 14:
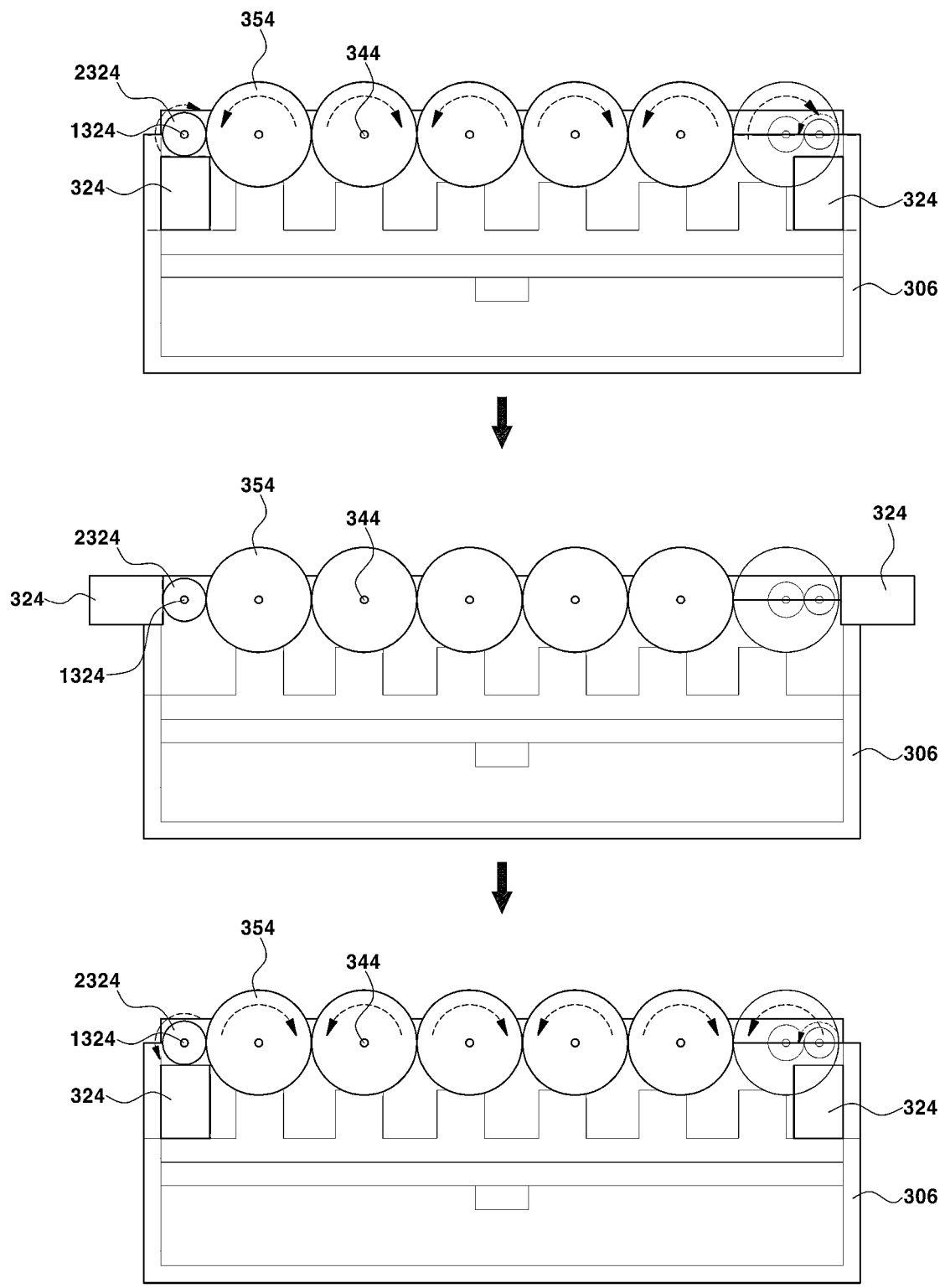
FIG. 14 illustrates the operation of releasing elements during the process in which the sterilization unit according to the present disclosure descends from the original position thereof (position in the overhead console) and returns back to the original position thereof.

As shown in FIG. 14, the rotary shafts 344 are rotated together with the releasing elements 324 when the releasing elements 324 are rotated. To this end, according to an embodiment of the present disclosure, rolling gears 354 are disposed on the rotary shaft 344. The rolling gears 354 are mounted to the respective rotary shafts 344, and the rotary shafts 344 are rotated by the rotation of the rolling gears 354. Also, the rolling gears 354 may be disposed in the frame 314. When the releasing element 324 is rotated, the rolling gear 354 disposed adjacent to the releasing element 324 receives rotating force and transmits the rotating force to another rolling gear 354 disposed adjacent thereto. The rotating force is sequentially transmitted to the rolling gears 354, which are disposed adjacent to each other, and the releasing element 324 disposed at the opposite side also spreads out in the horizontal direction due to the rotating force. Accordingly, the rotating elements 334 open the respective chambers 2314. The releasing elements 324 always spread out from the vertical direction in the horizontal direction due to the torsion springs, or are rotated outwards from the fitting portions 1314, and are then fitted back into the fitting portions 1314 by the external force applied toward the center line of the frame 314 or by the fixing elements 4.

More specifically, the releasing element 324 may include a gear 2324 that rotates about the shaft 1324. When the external force applied to the releasing element 324 is removed, the gear 2324 rotates about the shaft 1324, and accordingly the releasing element 324, which is accommodated in the fitting portion 1314 and the cut-out portion 2306, starts to protrude outwards. At the same time, the releasing element 324 is fully spread out from the fitting portion 1314 and the cut-out portion 2306 by the torsion spring. During this process, the rolling gear 354, which is adjacent to the releasing element 324, is rotated by the rotation of the releasing element 324, and the other rolling gears 354 arranged adjacent thereto are sequentially rotated. Finally, the releasing element 324 disposed at the opposite side is also spread out by the rotation of the rolling gear 354 disposed adjacent thereto. The releasing element 324 spread out from the frame 314 is fitted back into the fitting portion 1314 by the external force applied toward the center line of the frame 314 or by the contact with the fixing element 4. The releasing element 324 is rotated in a direction opposite the direction in which the releasing element 324 is spread out, and the rolling gears 354 arranged adjacent thereto are sequentially rotated. Finally, the rotating force is transmitted to the releasing element 324 disposed at the opposite side, and the corresponding releasing element 324 is fitted back into the fitting portion 1314. The gears 2324 may be provided at both sides of the frame 314. However, it is sufficient that only one of the releasing elements 324 that are disposed opposite each other with respect to the center line of the sterilization unit 30 includes the gear 2324.

Figure 15A:
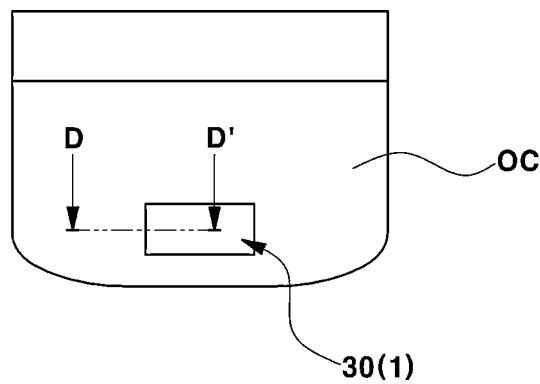
FIG. 15A illustrates the external appearance of the sterilization unit when the sterilization unit is located in the overhead console.
Figure 15B:
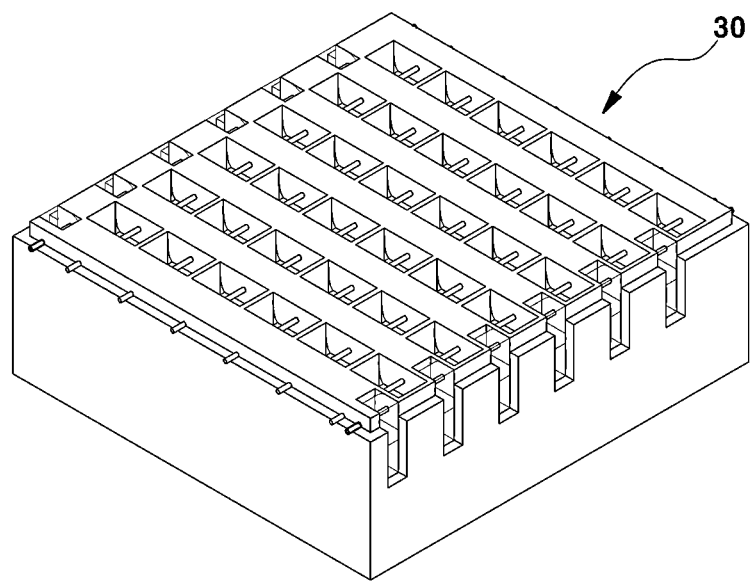
FIG. 15B illustrates the configuration of the sterilization unit in the state of FIG. 15A.
Figure 15C:
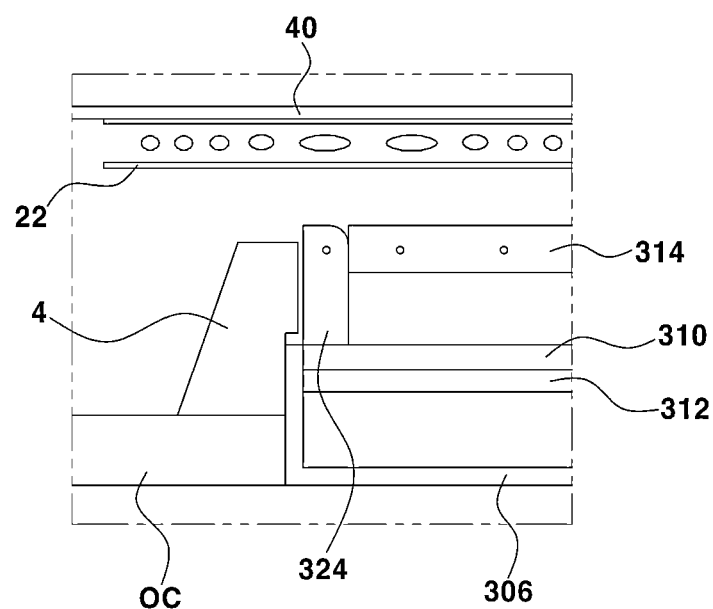
FIG. 15C is a cross-sectional view taken along line D-D' in FIG. 15A.

The operation of the inner cover 304 for improving heat dissipation performance is now described. FIG. 15A illustrates the external appearance of the sterilization unit 30 when the sterilization unit 30 is located in the overhead console OC. FIG. 15B illustrates the configuration of the sterilization unit 30 in the state of FIG. 15A. FIG. 15C is a cross-sectional view taken along line D-D' in FIG. 15A. When the sterilization unit 30 is located in the overhead console OC, the releasing elements 324 are in the state of being accommodated in the fitting portions 1314 and the cut-out portions 2306. As shown in FIG. 15C, the releasing elements 324 are maintained in the state of being accommodated in the fitting portions 1314 and the cut-out portions 2306 by the fixing elements 4 formed at the overhead console OC. The torsion springs are in the state of being compressed.

Figure 16A:
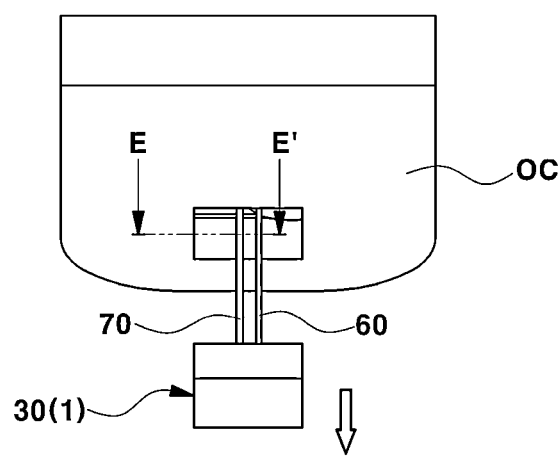
FIG. 16A illustrates the external appearance of the sterilization unit when the sterilization unit descends from the overhead console.
Figure 16B:
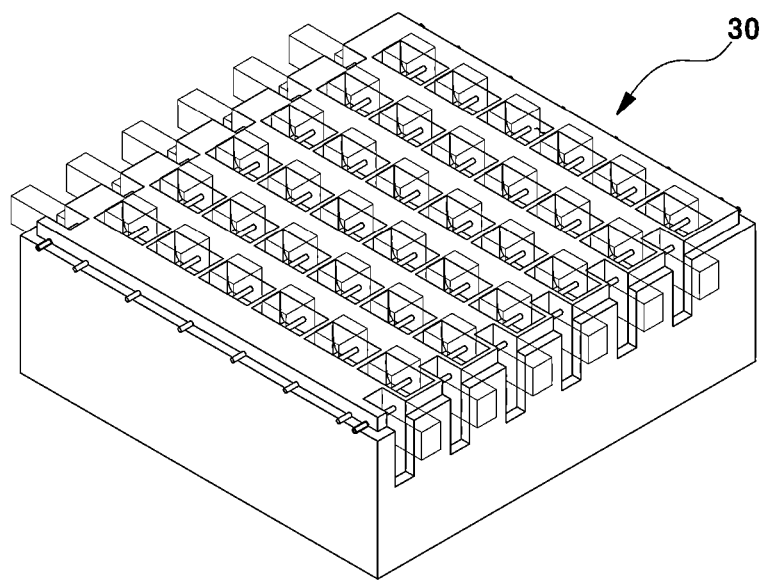
FIG. 16B illustrates the configuration of the sterilization unit in the state of FIG. 16A.
Figure 16C:
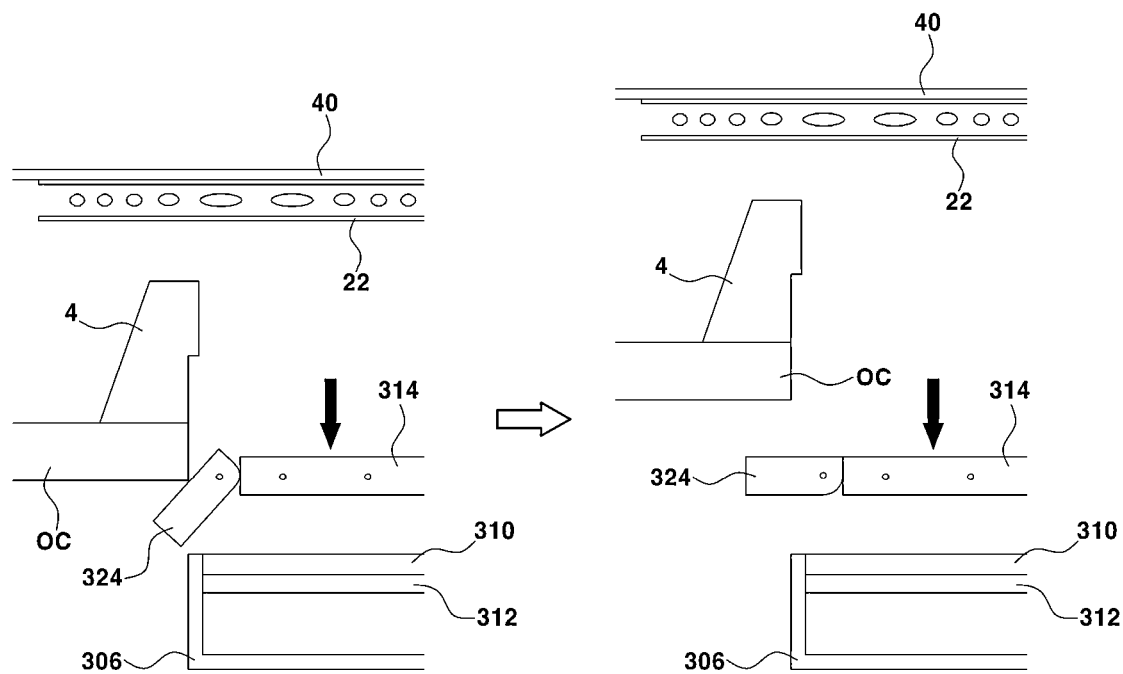
FIG. 16C is a cross-sectional view taken along line E-E' in FIG. 16A.

FIG. 16A illustrates the external appearance of the sterilization unit 30 when the sterilization unit 30 descends from the overhead console OC. FIG. 16B illustrates the configuration of the sterilization unit 30 in the state of FIG. 16A. FIG. 16C is a cross-sectional view taken along line E-E in FIG. 16A. When the sterilization unit 30 descends from the overhead console OC, the pushing operation of the fixing elements 4 is released, whereby the releasing elements 324 are spread out, and are maintained in the spread-out state by the torsion springs. When the sterilization unit 30 descends from the overhead console OC, the torsion springs compressed in the overhead console OC are restored to the original state thereof, and the restored torsion springs maintain the releasing elements 324 in the spread-out state. When the sterilization unit 30 returns to the original position thereof, i.e., moves into the overhead console OC, the releasing elements 324 are inserted into the overhead console OC through a process opposite the aforementioned process, and are then fitted into the fitting portions 1314 and the cut-out portions 2306 by the fixing elements 4. As is described below, according to the present disclosure, it is possible to effectively dissipate heat through the above-described structure when the sterilization unit 30 is in a high-temperature environment or is performing sterilization.

Figure 17:
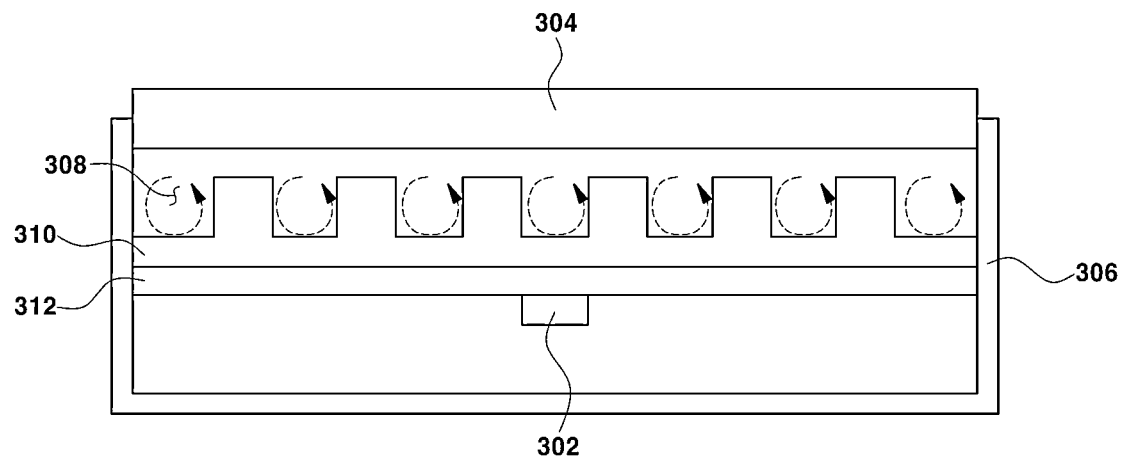
FIG. 17 is a cross-sectional view taken along line A-A' in FIG. 6.

As shown in FIG. 17, in case in which the inner cover 304 is formed in a general plate shape (refer to FIG. 6), heat stays in the sealed space 308 as indicated by the arrows and is not dissipated smoothly, whereby heat dissipation performance is degraded. However, the structure of the inner cover 304 according to the present disclosure may provide excellent heat dissipation performance. In other words, when the sterilization unit 30 descends from the overhead console OC, the releasing elements 324 are spread out in the horizontal direction, and thus the heat in the space 308 flows in the horizontal direction (indicated by the left and right dotted arrows in FIG. 12A). Further, as the releasing elements 324 are spread out in the horizontal direction, the releasing elements 324 are connected to the frame 314, which is made of an aluminum material, whereby the heat dissipation area may be increased. At the same time, as indicated by the arrows in FIG. 12B, the rotating elements 334 are rotated in the vertical direction, and thus the heat in the space 308 may be dissipated through the chambers 2314 in the vertical direction. Furthermore, as the rotating elements 334 are rotated, the rotating elements 334 come into contact with the heat sink 310, whereby the height of the heat sink 310 is increased, resulting in the increase in the heat dissipation area.

Figure 18:
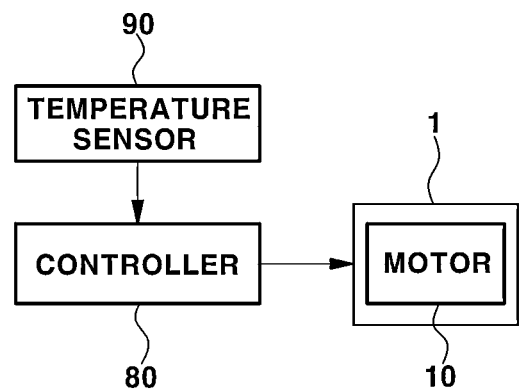
FIG. 18 illustrates the configuration of a control system of the UV sterilization apparatus according to the present disclosure.

As shown in FIG. 18, the UV sterilization apparatus 1 according to the present disclosure further includes a controller 80. The controller 80 is configured to move the position of the sterilization unit 30 in response to the input conditions. The input conditions include the temperature in the passenger compartment of a vehicle and/or a request from an occupant of a vehicle. The controller 80 is configured to drive the motor 10 in order to move the position of the sterilization unit 30. In addition, the controller 80 is configured to communicate with a temperature sensor 90, which is configured to measure the temperature in the passenger compartment of a vehicle. Hereinafter, the operation of the controller 80 is described.

The UV sterilization apparatus 1 according to the present disclosure is automatically operated as follows. The UV sterilization apparatus 1 according to the present disclosure may be configured to automatically move in order to prevent deterioration in the performance thereof in a high-temperature environment, i.e., when the temperature in the passenger compartment of a vehicle exceeds a predetermined level.

Figure 19:
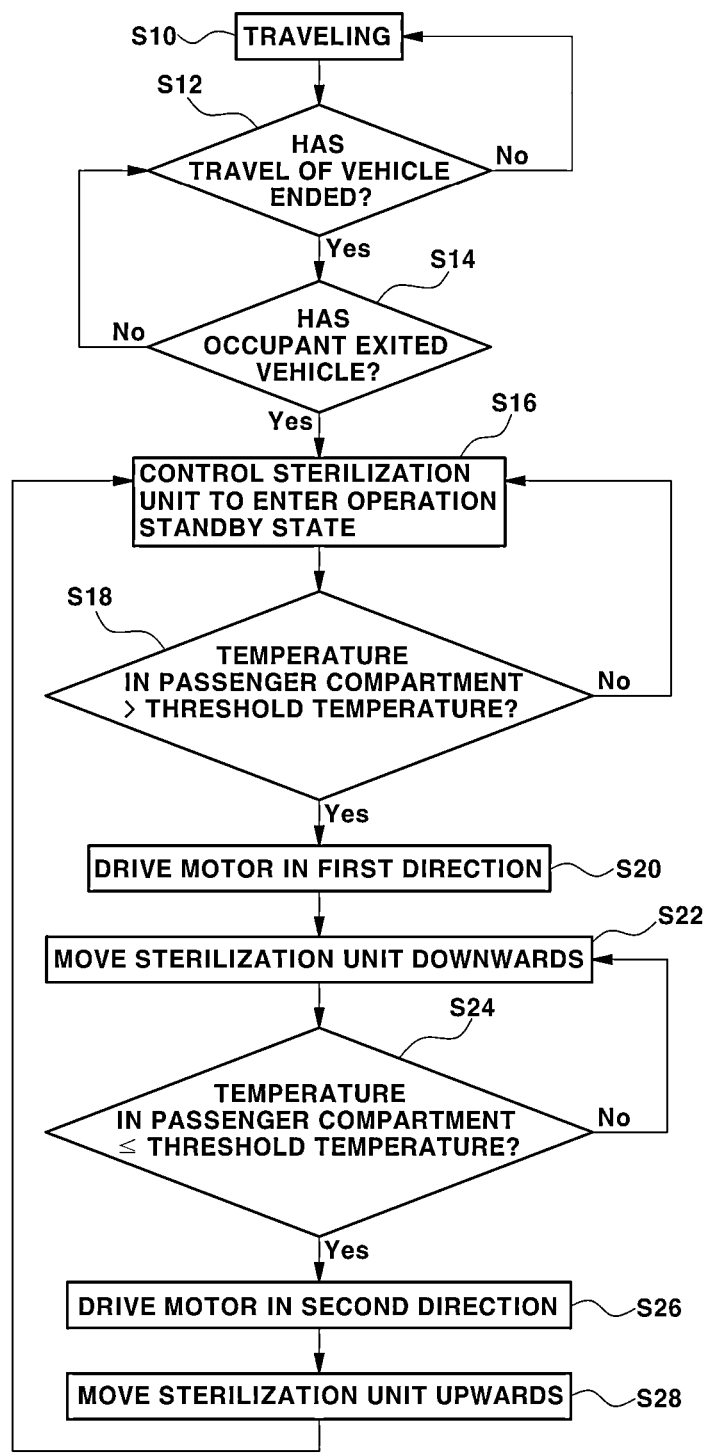
FIG. 19 is a control flowchart of the UV sterilization apparatus according to the present disclosure under a high-temperature condition.

Referring to FIG. 19, the controller 80 determines whether the travel of the vehicle has ended (S10 and S12). For example, the controller 80 may sense whether the travel of the vehicle has ended through communication with the vehicle control unit. At the end of the travel of the vehicle, the sterilization unit 30 is inserted into the overhead console OC. When the occupant gets out of the vehicle, the sterilization unit 30 enters an operation standby state.

Figure 20A:
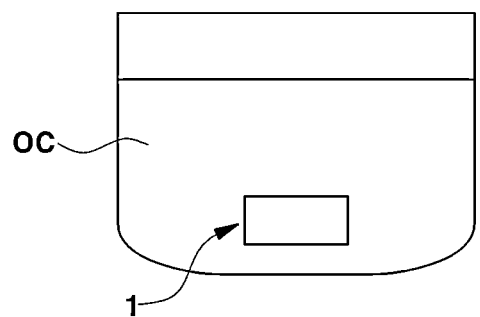
FIG. 20A illustrates the operation standby state of a sterilization unit according to the present disclosure in the overhead console.

Upon determining that the travel of the vehicle has ended, the controller 80 determines whether there is an occupant in the vehicle (S14). Upon determining that there is no occupant in the vehicle, as shown in FIG. 20A, the sterilization unit 30 enters the operation standby state (S16) at which point the sterilization unit 30 is located in the overhead console OC.

Figure 20B:
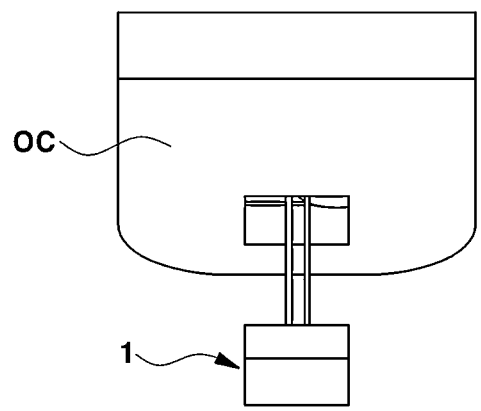
FIG. 20B illustrates the state in which the sterilization unit according to the present disclosure descends from the overhead console.

When the sterilization unit 30 is in the operation standby state, the controller 80 receives information about the temperature in the passenger compartment of the vehicle in real time from the temperature sensor 90. For example, when the outdoor temperature is high and the vehicle is parked outdoors, the temperature in the indoor space of the vehicle increases, and the temperature of the sterilization unit 30, which is located in the enclosed space, also increases. Accordingly, upon determining that the temperature in the passenger compartment of the vehicle exceeds a predetermined threshold temperature, for example, 30 degrees Celsius, based on the temperature information received from the temperature sensor 90 (S18), the controller 80 controls the motor 10 to be driven. The controller 80 drives the motor 10 in the first direction so that the sterilization unit 30 descends (S20). The first pulley 22 and the second pulley 24 are rotated by the operation of the motor 10 so that the sterilization unit 30 descends (S22). The sterilization unit 30 descends and is located outside the overhead console OC, as shown in FIG. 20B.

In the state in which the sterilization unit 30 is moved downwards, the controller 80 continuously receives the information about the temperature in the passenger compartment of the vehicle from the temperature sensor 90 and determines whether the temperature in the passenger compartment of the vehicle is lower than or equal to the threshold temperature (S24). Upon determining that the temperature in the passenger compartment of the vehicle is lower than or equal to 30 degrees Celsius, which is the threshold temperature, the controller 80 drives the motor 10 again so that the sterilization unit 30 ascends to the original position thereof. In other words, the controller 80 drives the motor 10 in the second direction, which is opposite the first direction (S26), whereby the sterilization unit 30 ascends to the position shown in FIG. 20A (S28). The present disclosure functions to prevent the sterilization unit 30 from getting hot in the confined space in the overhead console OC in a high-temperature environment and to remove heat from the sterilization unit 30 by moving the same downwards. Accordingly, it is possible to prevent deterioration in the sterilization performance of the sterilization unit 30 due to high temperatures and to improve the durability thereof.

In the state in which the UV sterilization apparatus 1 is in a high-temperature environment, when the sterilization unit 30 descends, as described above, the releasing elements 324 are spread out, and the rotating elements 334 are rotated, thereby promoting circulation of air into the space 308.

Accordingly, the UV sterilization apparatus 1 according to the present disclosure may have the maximized heat dissipation performance.

According to an embodiment of the present disclosure, the UV sterilization apparatus 1 may be moved when performing sterilization in response to a request from an occupant. The controller 80 is configured to enter the sterilization mode in response to the request from the occupant.

Figure 21:
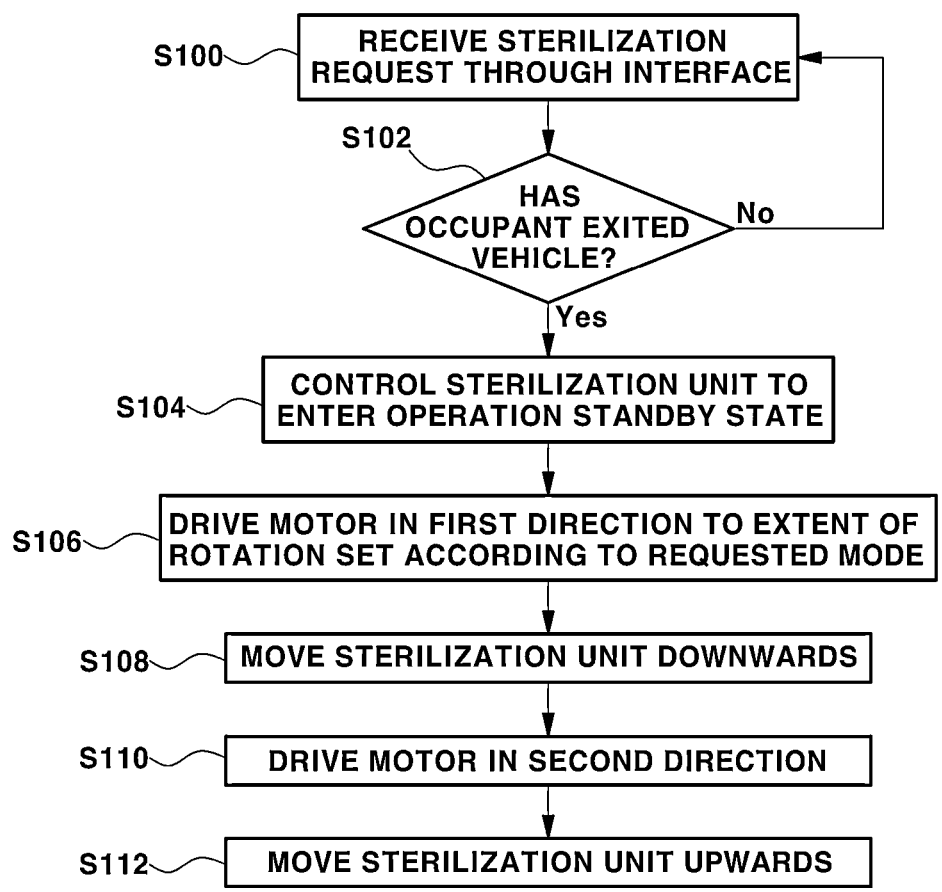
FIG. 21 is a control flowchart of the UV sterilization apparatus according to the present disclosure when responding to a user request.

As shown in FIG. 21, the request from the occupant is transmitted to the controller 80 through an interface, such as an audio-video-navigation (AVN) system of the vehicle or a smart device configured to communicate with the vehicle (S100). The request from the occupant may request any of several modes. For example, the requested sterilization mode may include at least a broad-range sterilization mode, an intensive sterilization mode, and an intermediate sterilization mode. The controller 80 may drive the motor 10 according to each mode to adjust the descending lengths of the first wire 60 and the second wire 70.

Upon receiving the sterilization request from an occupant, the controller 80 determines whether there is an occupant in the vehicle (S102). Upon determining that there is no occupant in the vehicle, the sterilization unit 30 enters the operation standby state in which the sterilization unit 30 can move (S104).

Figure 22A:
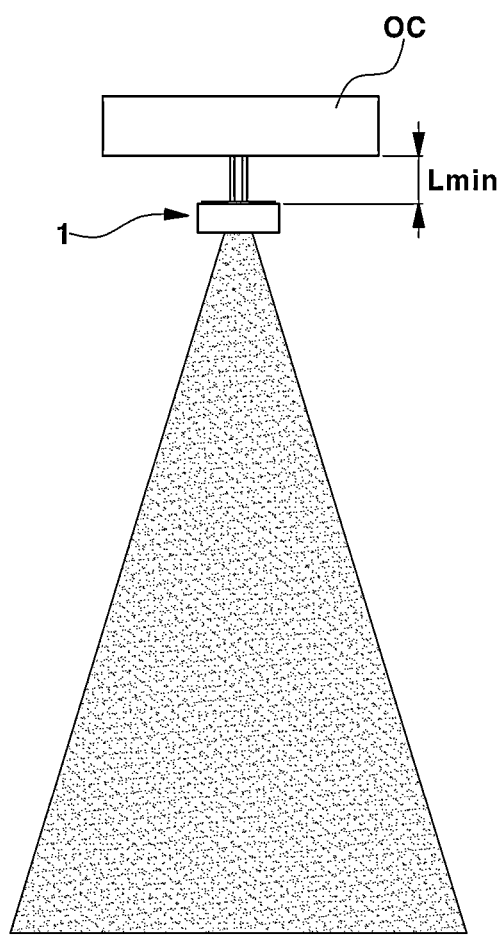
FIG. 22A is a front view of the UV sterilization apparatus according to the present disclosure when the lengths of first and second wires are set to minimum lengths.
Figure 22B:
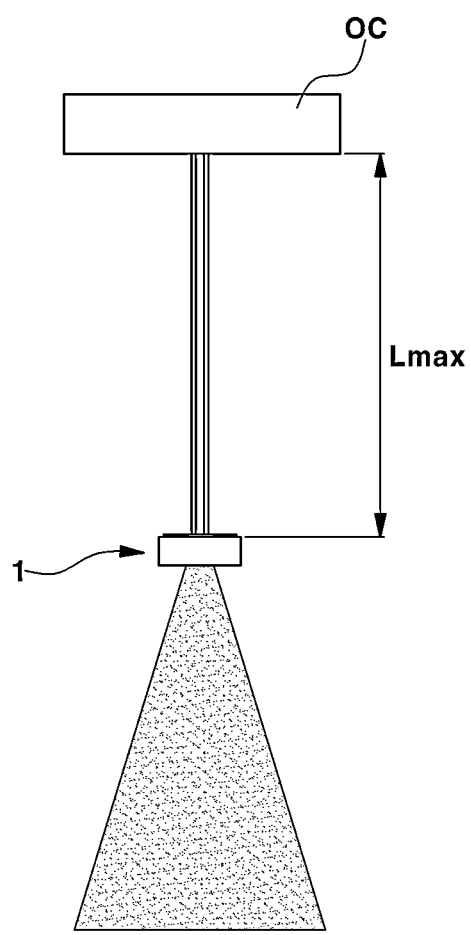
FIG. 22B is a front view of the UV sterilization apparatus according to the present disclosure when the lengths of the first and second wires are adjusted to the maximum lengths.

According to each mode, the descending distance of the sterilization unit 30 may be set by adjusting the lengths that the first wire 60 and the second wire 70 are withdrawn out of the overhead console OC. As shown in FIGS. 22A and 22B, according to the requested sterilization mode, the controller 80 controls the withdrawal lengths of the first and second wires 60 and 70 between the minimum lengths Lmin (as shown in FIG. 22A) and the maximum lengths Lmax (as shown in FIG. 22B) of the first and second wires 60 and 70, thereby enabling sterilization suitable for the requested sterilization mode. In other words, the controller 80 may drive the motor 10 in the first direction to the extent of rotation set according to the requested mode (S106), whereby the sterilization unit 30 descends a predetermined distance (S108).

For example, when the occupant requests broad-range sterilization, the sterilization unit 30 descends a relatively short distance from the overhead console OC (FIG. 22A). On the other hand, when the occupant requests intensive sterilization, the sterilization unit 30 descends the predetermined maximum descending distance from the overhead console OC (FIG. 22B). In addition, when the occupant requests intermediate sterilization, the sterilization unit 30 descends a distance suitable therefor. The sterilization performance of the sterilization apparatus depends on the distance to the target to be sterilized. According to the present disclosure, it is possible to secure excellent sterilization performance by moving the UV sterilization apparatus 1 close to the target to be sterilized. In addition, the present disclosure provides the broad-range sterilization function and the intensive sterilization function in response to the selection of a user, thereby providing diversity and convenience in sterilization.

After the sterilization unit 30 descends and performs sterilization for a predetermined time, the controller 80 drives the motor 10 in the second direction (S110). Thereby, the sterilization unit 30 ascends and is inserted into the overhead console OC to return to the original position thereof (S112).

When the sterilization unit 30 descends while the UV sterilization apparatus 1 is performing sterilization, as described above, the releasing elements 324 are spread out, and the rotating elements 334 are rotated, thereby promoting circulation of air into the space 308. Accordingly, the UV sterilization apparatus 1 according to the present disclosure may have the maximized heat dissipation performance.

According to the present disclosure, the sterilization unit 30 is configured to be movable to adjust the distance between the sterilization unit and the target to be sterilized, thereby making it possible to improve the sterilization performance.

In addition, according to the present disclosure, when the UV sterilization apparatus 1 is in a high-temperature environment, the sterilization unit 30 is moved out of the overhead console OC to be cooled.

In addition, according to the present disclosure, when the sterilization unit 30 is in a high-temperature environment or performs sterilization in which a large amount of heat is generated, the sterilization unit 30 descends from the overhead console OC, thereby promoting circulation of air into the sterilization unit 30, thus maximizing the heat dissipation performance.

As is apparent from the above description, the present disclosure provides a UV sterilization apparatus having improved sterilization performance and reliability.

In addition, the present disclosure provides a UV sterilization apparatus having excellent heat dissipation performance.

However, the effects achievable through the present disclosure are not limited to the above-mentioned effects, and other effects not mentioned herein should be clearly understood by those having ordinary skill in the art from the above description.

The disclosure has been described in detail with reference to embodiments thereof. However, it should be appreciated by those having ordinary skill in the art that changes may be made in these embodiments without departing from the principles and spirit of the disclosure, the scope of which is defined in the appended claims and their equivalents.

What is claimed is:

1. An ultraviolet (UV) sterilization apparatus comprising:
   a sterilization unit configured to be movable to a predetermined position, the sterilization unit comprising a UV emitter;
   a driving unit configured to move the sterilization unit; and
   a cover having a structure accommodating the sterilization unit and allowing an inside of the cover to communicate with an outside,
   wherein a heat sink is provided in the cover in order to dissipate heat from the sterilization unit, wherein the cover comprises:
      a frame;
      a releasing element rotatably coupled to the frame and configured to fluidly communicate the inside of the cover with the outside; and
      a plurality of fitting portions arranged in each of both sides of the frame to be spaced apart from each other at regular intervals,
   wherein the releasing element includes a plurality of releasing elements configured to be received in the plurality of fitting portions by an external force, and wherein, when the external force is removed, the plurality of releasing elements is rotated and is spread out from the plurality of fitting portions to allow the inside of the cover to communicate with the outside.

2. The UV sterilization apparatus of claim 1, wherein the frame comprises:
a plurality of chambers arranged in intervals between the plurality of fitting portions to be spaced apart from each other at regular intervals, the plurality of chambers allowing the inside of the cover to communicate with the outside; and
a plurality of rotating elements inserted into the plurality of chambers to be rotatable in the plurality of chambers.

3. The UV sterilization apparatus of claim 2, wherein the plurality of rotating elements is configured to be rotated by rotation of the plurality of releasing elements.

4. The UV sterilization apparatus of claim 3, wherein the plurality of rotating elements is connected to rolling gears configured to receive a rotating force of the plurality of releasing elements by a rotary shaft penetrating the plurality of rotating elements, and
wherein the rolling gears are engaged with the plurality of releasing elements to be rotated together with the plurality of releasing elements.

5. The UV sterilization apparatus of claim 4, wherein, based on the plurality of releasing elements being rotated and being spread out, the plurality of rotating elements is rotated to allow the inside of the cover to communicate with the outside.

6. The UV sterilization apparatus of claim 1, wherein the UV sterilization apparatus is accommodated in an overhead console of a vehicle, and the external force is provided by fixing elements provided in the overhead console.

7. The UV sterilization apparatus of claim 2, further comprising:
a printed circuit board accommodated in the cover, the printed circuit board being configured to control operation of the UV emitter,
wherein the UV emitter is connected to the printed circuit board, and the heat sink is coupled to the printed circuit board.

8. The UV sterilization apparatus of claim 7, wherein the frame is disposed on the heat sink, and an empty space is formed between the heat sink and the frame.

9. The UV sterilization apparatus of claim 8, wherein the plurality of rotating elements is configured to come into contact with the heat sink during rotation of the plurality of rotating elements.

10. The UV sterilization apparatus of claim 1, wherein the driving unit comprises:
a motor configured to provide a rotating force; and
a pulley configured to be rotated by the motor, and
wherein a wire connected to the sterilization unit is wound around or unwound from the pulley.

11. The UV sterilization apparatus of claim 10, wherein the pulley comprises:
a first pulley configured to directly receive a rotating force from the motor; and
a second pulley engaged with the first pulley to be rotated together with the first pulley, and
wherein the wire comprises a first wire and a second wire, and the first wire is wound around the first pulley, and the second wire is wound around the second pulley.

12. The UV sterilization apparatus of claim 10, further comprising:
a wire-fixing ring configured to guide the wire unwound from the pulley.

* * * * *